(12) United States Patent
Kane et al.

(10) Patent No.: US 6,260,274 B1
(45) Date of Patent: Jul. 17, 2001

(54) GASOLINE-POWERED CIRCULAR SAW

(76) Inventors: Daniel S. Kane, 1123 Golson, Calhoun, LA (US) 71225-9203; Tommy E. Eaves, P.O. Box 403, Tenaha, TX (US) 75974

( * ) Notice: Subject to any disclaimer, the term of this patent is extended or adjusted under 35 U.S.C. 154(b) by 0 days.

(21) Appl. No.: 09/382,719

(22) Filed: Aug. 24, 1999

(51) Int. Cl.⁷ .................................................... B23D 45/16
(52) U.S. Cl. ................................................ 30/122; 30/390
(58) Field of Search ........................... 30/122, 388–391; 125/13.01

(56) References Cited

U.S. PATENT DOCUMENTS

| | | | |
|---|---|---|---|
| 4,121,336 | 10/1978 | Loyd | 30/122 |
| 4,850,109 | 7/1989 | Kerwin | 30/122 |
| 4,876,797 | 10/1989 | Zapata | 30/388 |
| 5,007,173 | 4/1991 | Rush | 30/391 |

*Primary Examiner*—Douglas D. Watts
(74) *Attorney, Agent, or Firm*—John M. Harrison

(57) ABSTRACT

A hand-held circular saw which is characterized by a gasoline-powered, trigger-operated blade drive unit connected to a conventional circular saw by means of a specially-designed adaptor. In a preferred embodiment the circular saw is characterized by a circular saw blade rotatably mounted in a saw housing which is connected to a drive shaft housing and adjacent gear housing. The adaptor is secured inside the drive shaft housing, and the blade drive shaft extends from connection to a blade-driving gear train inside the gear housing, and through the adaptor and projects from the drive shaft housing. The blade drive unit receives the protruding blade drive shaft, and is fitted with an attachment collar which removably receives the adaptor to connect the blade drive unit to the circular saw. The gasoline-powered circular saw is lightweight, efficient and suitable for outdoor home, farm or commercial use.

14 Claims, 3 Drawing Sheets

GASOLINE-POWERED CIRCULAR SAW

BACKGROUND OF THE INVENTION

1. Field of the Invention

This invention relates to powered hand saws and more particularly, to a hand-held, gasoline-powered circular saw which is characterized by a gas-powered, trigger-operated blade drive unit connected to a conventional circular saw by means of a specially-designed adaptor. In a preferred embodiment the blade drive unit is a conventional line-trimming apparatus drive unit, and the conventional circular saw is characterized by a circular saw blade rotatably mounted in a saw housing which is connected to a drive shaft housing and adjacent gear housing. The adaptor is secured inside the drive shaft housing and includes a circular adaptor base which is typically bolted to the drive shaft housing interior, and a shaft cylinder extends from the adaptor base. The blade drive shaft connects in conventional fashion to a blade-driving gear train located inside the gear housing, and extends from the gear housing through the adaptor base and shaft cylinder, respectively, of the adaptor and projects from the drive shaft housing. The blade drive unit receives the protruding blade drive shaft and is fitted with an attachment collar which removably receives the adaptor, to connect the blade drive unit to the circular saw. The gasoline-powered circular saw is lightweight, efficient and suitable for outdoor home, farm or commercial use.

Electric circular saws are widely used in the construction industry, as well as in private workshops and homes. Since most electric circular saws require a power cord which must be plugged into a power source for operation of the saw, the saws are not truly portable and cannot be used under inclement weather conditions without jeopardizing the safety of the saw operator. These problems are particularly apparent when operation of the saws is needed for construction of roads, highways, bridges or other outdoor structures. Moreover, battery-powered saws can be adversely affected by moist or cold weather, and re-charging of the batteries can be problematic when the construction site is in a remote location with respect to a suitable battery-charging facility.

2. Description of the Prior Art

Various gas-powered saws, as well as adaptors for inter-conversion of gas-powered chain saws and circular saws, are known in the art. U.S. Pat. No. 4,121,336, dated Oct. 24, 1978, to Ellis R. Loyd, describes a "Combination Power Saw and Chain Saw and Adaptor", for converting a gasoline or electric circular saw to a chain saw, and vice-versa. The adaptor is characterized by a rectangular plate to which is attached a blade guard for receiving the conventional frame plate and blade of a chainsaw, which frame plate houses a drive sprocket for the chainsaw blade. After the blade of a conventional circular saw is removed from the circular saw frame, the circular saw frame is mounted on the rectangular plate and the saw drive shaft, connected to the engine inside the circular saw frame, is extended through an opening in the blade guard to engage the drive sprocket. The chainsaw blade is driven on the chainsaw frame plate as the circular saw engine is operated. An "Adaptor to Convert a Chain Saw to a Circular Saw" is detailed in U.S. Pat. No. 4,850,109, dated Jul. 25, 1989, to Michael A. Kerwin. The adaptor is characterized by a cylindrical collar which is secured by means of a washer and nut to the clutch housing and hub of the chain saw. A concentric opening extends through the collar, and has a ribbed, reduced diameter portion for receiving the clutch hub of the chainsaw and a threaded, enlarged diameter portion for receiving a threaded shaft extension plug. The shaft extension plug includes a face plate and a threaded shaft which extends concentrically from the face plate, for receiving a circular saw blade and a nut for securing the circular saw blade on the shaft. U.S. Pat. No. 4,876,797, dated Oct. 31, 1989, to Alvaro Zapata, details a "Reduced Vibration Portable Gas Operated Hand Saw" having a housing fitted with a carburetor and an engine, a handle which is mounted at one end of the housing and is provided with a trigger coupled to the carburetor, and a saw blade mounted at the other end of the housing. A worm gear, engaged by a centrifugal clutch which is driven by the engine, drives a rotatable shaft to which the saw blade may be keyed for rotation. Fans rotate with the clutch and saw blade, for cooling purposes. Anti-vibration elements are provided to isolate the handle and trigger from the engine. A rubber mount is interposed between the engine and housing to isolate engine vibration from the saw blade housing, saw plate, handle and trigger. A "Gasoline Engine Powered Hand-Held Circular Saw" is described in U.S. Pat. No. 5,007,173, dated Apr. 16, 1991, to Robert E. Rush. The saw includes a gasoline-powered engine which is incorporated into the body or frame of a circular saw. The engine is preferably a two-stroke engine, and is connected to a crank shaft to which the circular saw blade is mounted typically through a centrifugal clutch for rotation therewith. A throttle trigger is typically connected to the engine for controlling the engine speed. A plate is preferably provided on the circular saw frame for resting the saw on the workpiece.

An object of this invention is to provide a hand-operated, gasoline-powered circular saw.

Another object of this invention is to provide a portable, hand-operated, gasoline-powered circular saw which is capable of being used under inclement weather conditions.

Still another object of this invention is to provide a circular saw characterized by a gasoline-powered, typically trigger-operated blade drive unit which is connected to a conventional circular saw by means of a specially-designed adaptor.

Yet another object of this invention is to provide a circular saw characterized by a conventional, gasoline-powered line trimming apparatus drive unit which is connected to a conventional circular saw by means of a specially-designed adaptor having an adaptor base for attachment to the circular saw and a shaft cylinder extending from the adaptor base for engaging the line trimming apparatus drive unit.

A still further object of this invention is to provide a hand-operated, gasoline-powered circular saw which is portable, lightweight, efficient and suitable for outdoor home, farm or commercial use.

SUMMARY OF THE INVENTION

These and other objects of the invention are provided in a gasoline-powered circular saw characterized by a gasoline-powered, trigger-operated blade drive unit which is connected to a conventional circular saw by means of a specially-designed adaptor. In a preferred embodiment the blade drive unit is a conventional, gasoline-powered, line-trimming apparatus drive unit, and the conventional circular saw is characterized by a circular saw blade rotatably mounted in a saw housing which is connected to a drive shaft housing and adjacent gear housing. The adaptor is secured inside the drive shaft housing and includes a circular adaptor base which is typically bolted to the drive shaft housing interior, and a shaft cylinder extends from the adaptor base of the adaptor. The blade drive shaft connects in conventional fashion to a blade-driving gear train located inside the gear housing, and extends from the gear housing through the adaptor base and shaft cylinder, respectively, of the adaptor and projects from the drive shaft housing. The blade drive unit receives the protruding blade drive shaft and includes an attachment collar which removably receives the adaptor, to connect the blade drive unit to the circular saw. The gasoline-powered circular saw is lightweight, efficient and suitable for outdoor home, farm or commercial

BRIEF DESCRIPTION OF DRAWING

The invention will be better understood by reference to the accompanying drawings, wherein.

DESCRIPTION OF THE PREFERRED EMBODIMENTS

Figure 5:
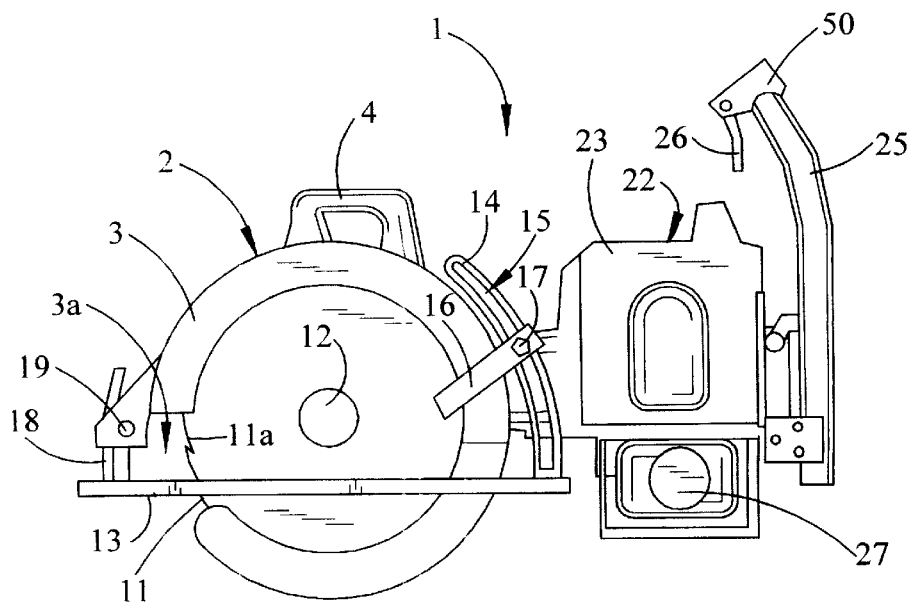
FIG. 5 is a left side view of the gasoline-powered circular saw illustrated in FIG. 1.

Referring initially to FIGS. 1–3 and 5 of the drawings, in a preferred embodiment the gasoline-powered circular saw of this invention is generally illustrated by reference numeral 1. The gasoline-powered circular saw 1 is characterized by a circular saw 2, such as that removed from a conventional, electric-powered blade drive unit (not illustrated). The circular saw 2 includes a saw housing 3, with a circular saw blade 11 rotatably mounted in the saw housing 3 on a saw blade shaft 12, as illustrated in FIG. 5. The saw housing 3 substantially encloses the continuous cutting edge 11a of the circular saw blade 11, and leaves the cutting edge 11a of the circular saw blade 11 exposed at a cutting gap 3a in the saw housing 3. The circular saw blade 11 extends through a blade slot (not illustrated), provided in a blade guide plate 13 which is rested on the board, lumber or other workpiece (not illustrated) being cut by the circular saw blade 11, during operation of the gasoline-powered circular saw 1 as hereinafter further described. As further illustrated in FIG. 5, a plate support 18 projects upwardly from the blade guide plate 13, adjacent to the front end thereof and is pivotally attached to the saw housing 3 at a pivot pin 19. An arcuate adjustment bracket 14, provided with an adjustment slot 15, extends upwardly from the blade guide plate 13, adjacent to the rear end thereof, and a bracket bolt 17 extends through a bracket arm 16, provided on the saw housing 3, and through the adjustment slot 15, respectively. Accordingly, by loosening the bracket bolt 17, sliding the adjustment bracket 14 on the bracket bolt 17 while pivoting the plate support 18 on the pivot pin 19, and re-tightening the bracket bolt 17, the blade guide plate 13 can be adjusted on the saw housing 3 to support the circular saw 2 on the lumber or workpiece, depending on the angle of the lumber or workpiece as hereinafter described.

Figure 1:
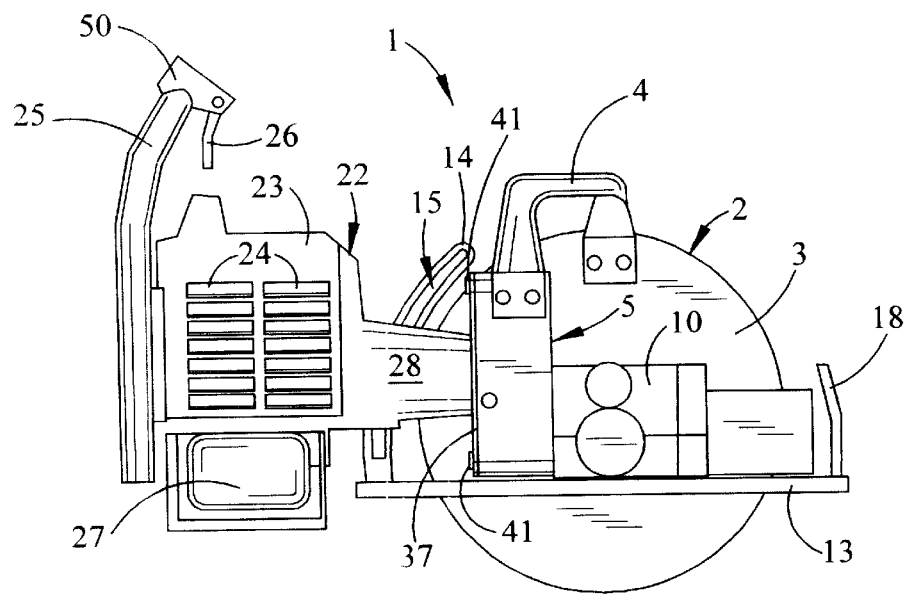
FIG. 1 is a right side view of a preferred embodiment of the gasoline-powered circular saw of this invention.
Figure 2:
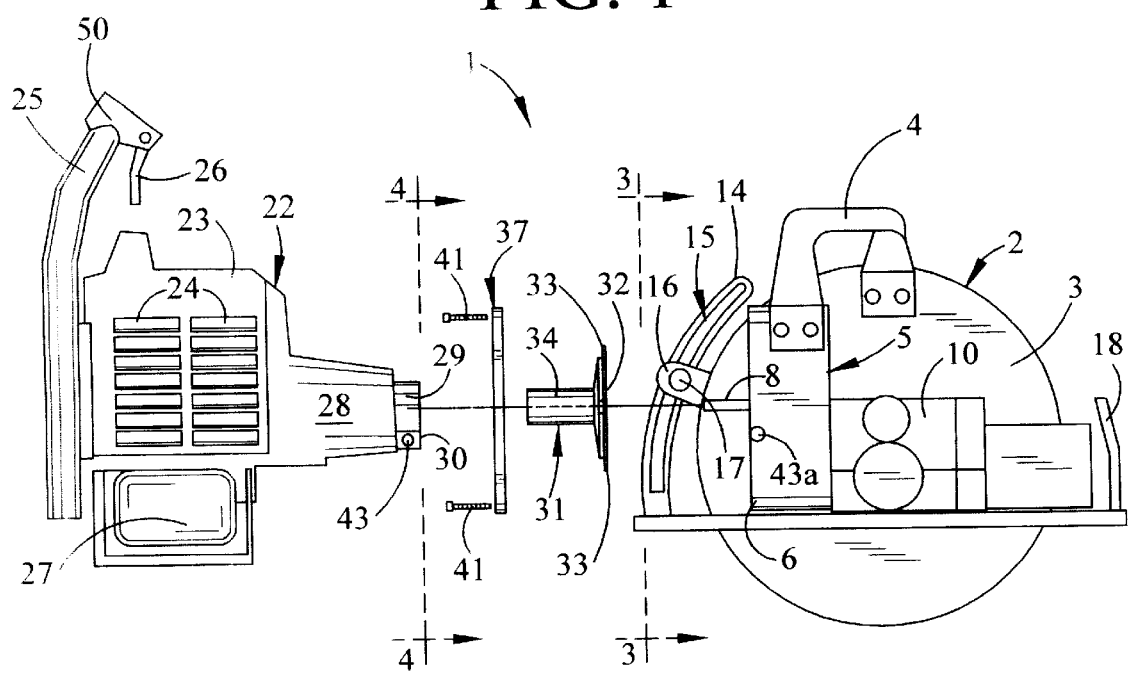
FIG. 2 is an exploded view of the gasoline-powered circular saw illustrated in FIG. 1, more particularly illustrating typically removable connection of the blade drive unit component of the gasoline-powered circular saw, to the circular saw component by means of an adaptor.
Figure 3:
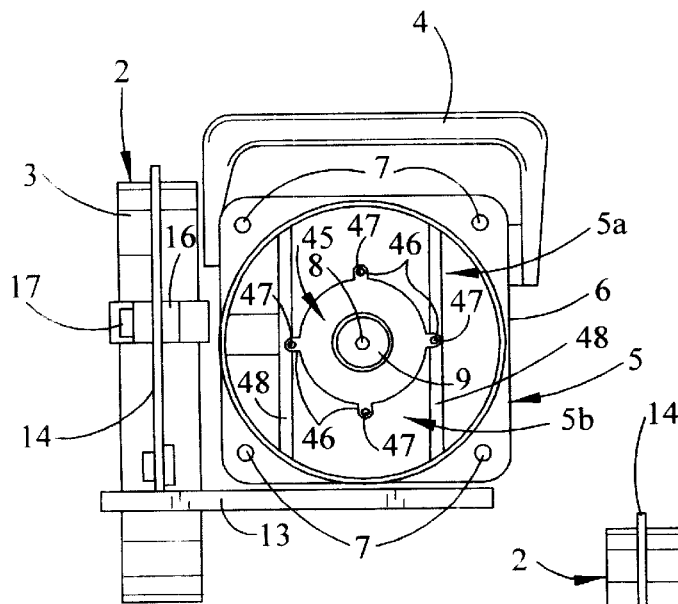
FIG. 3 is a rear view of the circular saw component of the gasoline-powered circular saw, with the circular saw removed from the blade drive unit as illustrated in FIG. 2.

As illustrated in FIG. 1, a drive shaft housing 5 and gear housing 10 are provided on the rear surface of the saw housing 3, and a saw handle 4 additionally connects the saw housing 3 with the drive shaft housing 5. As illustrated in FIG. 3, the drive shaft housing 5 includes a circular housing rim 6 which circumscribes a housing opening 5a of the drive shaft housing interior 5b. A housing grate 48 separates the gear housing 10 interior (not illustrated) from the drive shaft housing interior 5b, and a circular adaptor seat 45 having multiple seat flanges 46 projecting therefrom in circumferentially-spaced relationship with respect to each other, is secured to the interior housing grate 48 of the drive shaft housing 5. A blade drive shaft 8 is connected in conventional fashion to a blade drive gear train (not illustrated), provided inside the gear housing 10 for driving the circular saw blade 1 inside the saw housing 3 upon rotation of the blade drive shaft 8, as hereinafter described. The blade drive shaft 8 extends from the gear housing 10 and through the housing grate 48, adaptor seat 45, housing interior 5b and housing opening 5a, respectively, and protrudes from the drive shaft housing 5 as illustrated in FIG. 2. As further illustrated in FIG. 3, a cylindrical spacer 9 is typically mounted on the blade drive shaft 8, inside the housing interior 5b and adjacent to the adaptor seat 45, for purposes which will be hereinafter further described.

Referring again to FIGS. 1, 2 and 5 of the drawings, as illustrated in FIG. 2 the circular saw 2 is operably connected to a gasoline-powered blade drive unit 22 by means of a connecting adaptor 31, specially designed for the purpose and hereinafter further described. The blade drive unit 22 is typically a gasoline-powered line trimming apparatus drive unit and includes an engine housing 23 which houses a conventional, gasoline-powered line trimming apparatus engine (not illustrated), and the engine housing 23 is typically fitted with multiple heat vent openings 24 for venting excess heat generated by the operating engine. A fuel tank 27 is typically mounted on the bottom of the engine housing 23 for containing gasoline for fueling the engine. A blade drive handle 25 extends upwardly typically from the rear surface of the engine housing 23, and is fitted with a power switch 50 for starting the engine, and a finger-actuated throttle trigger 26 for engaging the engine in blade-driving configuration. A drive shaft receptacle 28 extends from the front of the engine housing 23, and is fitted with a split attachment collar 29 having a pair of adjacent collar flanges 30 (one of which is illustrated in FIG. 2). As hereinafter further described, an Allen screw (not illustrated) is threaded through aligned screw openings 43, provided in the adjacent collar flanges 30, to facilitate tightening the attachment collar 29 around the connecting adaptor 31 and securing the blade drive unit 22 on the circular saw 2.

Figure 4:
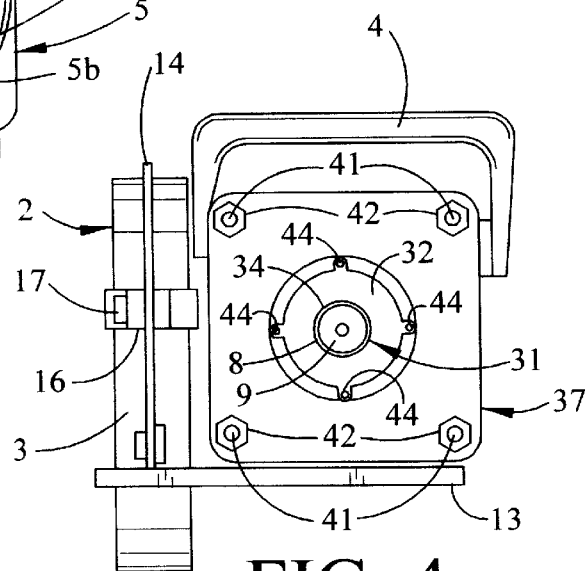
FIG. 4 is a rear view of the circular saw component of the gasoline-powered circular saw, removed from the blade drive unit, with the adaptor and a connector plate mounted on the circular saw component.
Figures 6, 6A:
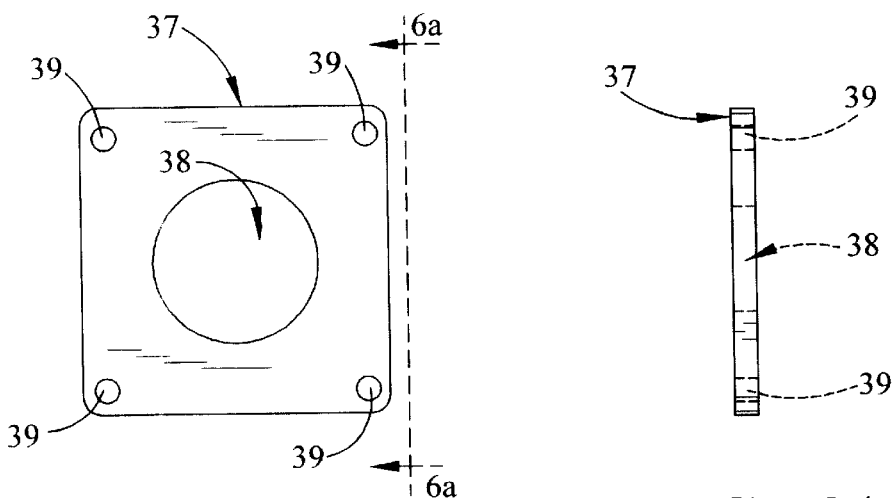
FIG. 6 is a front view of the connector plate component of the gasoline-powered circular saw, illustrated in FIG. 4.
FIG. 6A is a side view taken along lines 6a–6a of the connector plate illustrated in FIG. 6.
Figure 7:
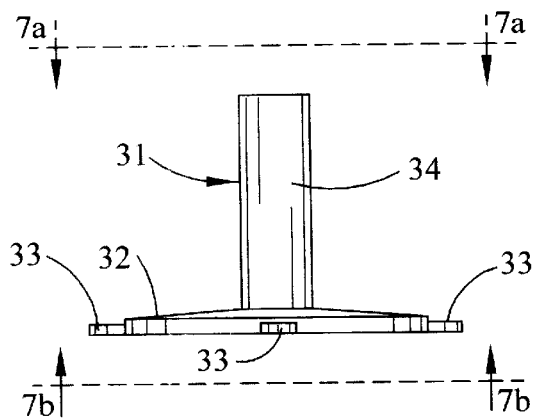
FIG. 7 is a side view of the adaptor component of the gasoline-powered circular saw.
Figures 7A, 7B:
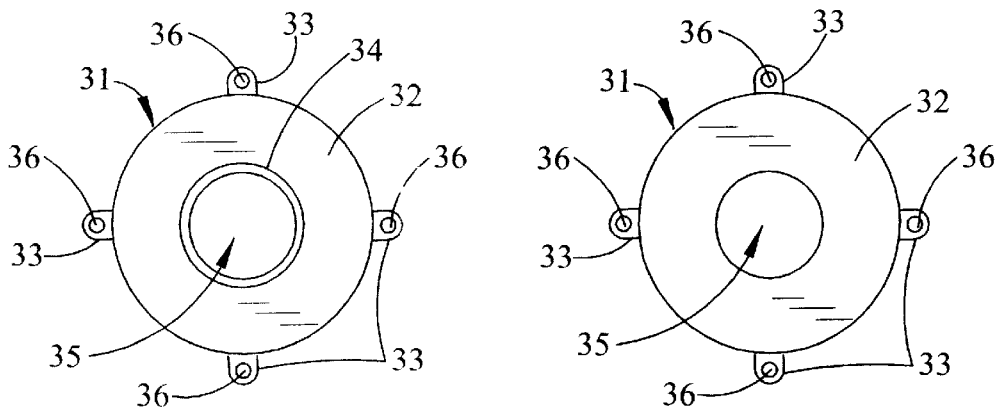
FIG. 7A is a top view of the adaptor, taken along lines 7a–7a in FIG. 7.
FIG. 7B is a bottom view of the adaptor, taken along lines 7b–7b in FIG. 7.

Referring again to FIGS. 1–4 and to FIGS. 6–7B of the drawings, the connecting adaptor 31 of the gasoline-powered circular saw 1 is typically constructed from stainless steel and, as particularly illustrated in FIG. 7, includes a circular adaptor base 32, with multiple base flanges 33 extending therefrom in substantially spaced-apart relationship with respect to each other around the circumference of the adaptor base 32. As illustrated in FIGS. 7A and 7B, an adaptor bolt opening 36 extends through each base flange 33, and an adaptor mount bolt 44 is extended through each adaptor bolt opening 36 as illustrated in FIG. 4, to secure the adaptor base 32 of the connecting adaptor 31 to the adaptor seat 45 (secured to the housing grate 48 inside the drive shaft housing 5, FIG. 3) as hereinafter further described. As further illustrated in FIG. 7, a shaft cylinder 34 extends from the adaptor base 32, and as illustrated in FIGS. 7A and 7B, a shaft bore 35 traverses the shaft cylinder 34 and extends through the adaptor base 32 of the connecting adaptor 31 for receiving the cylindrical spacer 9 (FIG. 3) and blade drive shaft 8 as the connecting adaptor 31 is mounted in the drive shaft housing 5.

As illustrated in FIGS. 4, 6 and 6A, after the connecting adaptor 31 is mounted inside the drive shaft housing interior 5a, a substantially rectangular, typically stainless steel connector plate 37 is mounted on the drive shaft housing 5 of the circular saw 2. Accordingly, bolts 41 are initially extended through respective plate bolt openings 39, provided in the respective corners of the connector plate 37, and threaded into respective registering housing bolt openings 7, provided in the drive shaft housing 5 as illustrated in FIG. 3, to secure the connector plate 37 against the drive shaft housing 5. The connector plate 37 is provided with a central shaft opening 38 for receiving the drive shaft receptacle 28 of the blade drive unit 22, in assembly of the gasoline-powered circular saw 1 as illustrated in FIG. 2 and hereinafter further described.

Referring again to FIGS. 1–4 of the drawings, in assembly of the gasoline-powered circular saw 1, the connecting adaptor 31 is initially secured to the adaptor seat 45 (FIG. 3), inside the drive shaft housing interior 5b. This is accomplished by initially inserting the cylindrical spacer 9 (mounted on the blade drive shaft 8), into the shaft bore 35 (FIGS. 7A and 7B) of the connecting adaptor 31, as illustrated in FIG. 2, and sliding the connecting adaptor 31 on the spacer 9 until the adaptor base 32 of the connecting adaptor 31 abuts against the adaptor seat 45. The adaptor base 32 is then secured to the adaptor seat 45, with the blade drive shaft 8 extending from the extending end of the shaft cylinder 34 of the connecting adapter 31. Accordingly, the adaptor mount bolts 44 (FIG. 4) are extended through the adaptor bolt openings 36 (FIG. 7A, provided in the respective base flanges 33 of the adaptor base 32), and threaded through the respective registering bolt openings 47 (FIG. 3, provided in the respective seat flanges 46 of the adaptor seat 45). The connector plate 37 is then mounted on the drive shaft housing 5 as heretofore described with respect to FIG. 4, by extending the bolts 41 through the respective plate bolt openings 39 (FIG. 6, provided in the connector plate 37) and threading the bolts 41 into the respective registering housing bolt openings 7 (FIG. 3, provided in the drive shaft housing 5). Assembly of the gasoline-powered circular saw 1 is completed by attaching the blade drive unit 22 to the circular saw 2. This is accomplished by initially inserting the blade drive shaft 8 (FIG. 2, protruding from the drive shaft housing 5), into the drive shaft receptacle 28 of the blade drive unit 22, as the drive shaft receptacle 28 is extended through the shaft opening 38 (FIG. 6) of the connector plate 37 and the connector socket 29 is inserted in the housing interior 5b. Accordingly, the Allen screw openings 43 (FIG. 2, provided in the collar flanges 30 of the attachment collar 29) are positioned in registry with an Allen screw opening 43a, provided in the drive shaft housing 5 as illustrated in FIG. 2. An Allen screw (not illustrated) is then extended through the Allen screw opening 43a and rotated in the clockwise direction through the Allen screw openings 43 using an Allen screw wrench (not illustrated), to thread the collar flanges 30 of the attachment collar 29 toward each other and tighten the attachment collar 29 around the shaft cylinder 34 of the connecting adaptor 31.

Referring again to FIGS. 2 and 5 of the drawings, in typical operation of the gasoline-powered circular saw 1, gasoline (not illustrated) of a suitable grade for fueling the engine (not illustrated, provided in the engine housing 23 of the blade drive unit 22), is poured in the fuel tank 27 of the blade drive unit 22. After the saw operator (not illustrated) grasps the blade drive handle 25 of the blade drive unit 22 with one hand and the saw handle 4 of the circular saw 2 with the other hand, the blade guide plate 13 of the circular saw 2 is rested on the board or lumber (not illustrated) to be cut. The engine is energized by actuating the power switch 50, and the engine is operated to engage the blade drive shaft 8 by depressing the throttle trigger 26. Accordingly, the engine rotates the blade drive shaft 8 and cylindrical spacer 9 (FIG. 4) inside the shaft cylinder 34 of the connecting adaptor 31, and transmits rotation through the gear train (not illustrated, contained inside the gear housing 10), to the saw blade 11. This causes the saw blade 11 to rotate inside the saw housing 3 with a rotational speed which is directly proportional to the rotational speed of the blade drive shaft 8, according to the degree of depression of the throttle trigger 26. As the saw blade 11 rotates inside the saw housing 3 in the clockwise direction illustrated in FIG. 1, the saw operator advances the cutting gap 3a of the saw housing 3 toward the edge of the board or lumber (not illustrated), and the rotating saw blade 11 is caused to contact the board or lumber through the cutting gap 3a, beneath the blade guide plate 13. As the gasoline-powered circular saw 1 is advanced over the board or lumber by using the blade drive handle 25 and saw handle 4, the rotating saw blade 11 cuts through the board or lumber in conventional fashion, as long as the throttle trigger 26 remains depressed. Rotation of the saw blade 11 is terminated as desired, by releasing the throttle trigger 26, and operation of the engine is terminated by depressing the power switch 50. It will be appreciated by those skilled in the art that the blade guide plate 13 can be adjusted in conventional fashion on the saw housing 3, as desired according to the angle of the board or lumber to be cut, by loosening the bracket bolt 17, sliding the adjustment bracket 14 on the bracket bolt 17 while pivoting the plate support 18 on the pivot pin 19, and re-tightening the bracket bolt 17 at the desired angle of the blade guide plate 13 on the saw housing 3.

It will be appreciated by those skilled in the art that the gasoline-powered circular saw 1 of this invention is capable of being used at virtually any outdoor location for the construction of buildings, roads, bridges and the like, and under inclement weather conditions which would render operation of an electric-powered circular saw, hazardous to the saw operator. Moreover, it will be appreciated by those skilled in the art that the gasoline-powered circular saw 1 can be assembled using an existing circular saw 2 removed from the electrical blade drive unit of a conventional electric-powered circular saw, and an existing, gasoline-powered blade drive unit 22 removed from a conventional gas-powered line trimming apparatus.

While the preferred embodiments of the invention have been described above, it will be recognized and understood that various modifications can be made in the invention and the appended claims are intended to cover all such modifications which may fall within the spirit and scope of the invention.

Having described my invention with the particularity set forth above, what is claimed is:

1. A gasoline-powered circular saw comprising a blade support, a saw blade rotatably carried by said blade support, a blade drive shaft operably engaging said saw blade for rotating said saw blade in said blade support, an adaptor having an adaptor base engaging said blade support and a shaft cylinder carried by said adaptor base, a gasoline-powered blade drive unit engaging said blade drive shaft and said shaft cylinder of said adaptor for rotating said blade drive shaft, said shaft cylinder of said adaptor inserted in and engaged by said blade-drive unit, whereby said saw blade rotates in said blade support responsive to operation of said gasoline-powered blade drive unit.

2. The gasoline-powered circular saw of claim 1 wherein said blade support comprises a saw housing substantially encircling said saw blade.

3. The gasoline-powered circular saw of claim 1 comprising a connector plate carried by said blade support for engaging said blade drive unit.

4. The gasoline-powered circular saw of claim 1 wherein said blade support comprises a saw housing substantially encircling said saw blade and comprising a connector plate carried by said blade support for engaging said blade drive unit.

5. The gasoline-powered circular saw of claim 2 wherein said blade support comprises a drive shaft housing carried by said saw housing and wherein said adaptor engages said drive shaft housing.

6. The gasoline-powered circular saw of claim 5 comprising a connector plate carried by said drive shaft housing for engaging said blade drive unit.

7. A gasoline-powered circular saw comprising a saw housing; a saw blade rotatably carried by said saw housing; a blade drive shaft operably engaging said saw blade for rotating said saw blade in said saw housing; an adaptor engaging said saw housing, said adaptor comprising an adaptor base for attachment to said saw housing and a shaft cylinder extending from said adaptor base for receiving said blade shaft; and a gasoline-powered blade drive unit including a drive shaft receptacle having a diameter larger than the diameter of said shaft cylinder for engaging said blade drive shaft and said shaft cylinder of said adaptor for rotating said blade drive shaft, said shaft cylinder of said adaptor inserted in said drive shaft receptacle of said blade drive unit, whereby said saw blade rotates in said saw housing responsive to operation of said gasoline-powered blade drive unit.

8. The gasoline-powered circular saw of claim 7 comprising a connector plate provided on said saw housing for engaging said blade drive unit.

9. The gasoline-powered circular saw of claim 7 comprising a drive shaft housing carried by said saw housing and wherein said adaptor engages said drive shaft housing.

10. The gasoline-powered circular saw of claim 7 comprising a connector plate provided on said saw housing for engaging said blade drive unit and a drive shaft housing carried by said saw housing, and wherein said adaptor engages said drive shaft housing.

11. The gasoline-powered circular saw of claim 7 comprising an adjustable blade guide plate carried by said saw housing.

12. The gasoline-powered circular saw of claim 11 comprising a connector plate provided on said saw housing for engaging said blade drive unit.

13. The gasoline-powered circular saw of claim 12 comprising a drive shaft housing carried by said saw housing and wherein said adaptor engages said drive shaft housing.

14. A gasoline-powered circular saw comprising a saw housing; a saw blade rotatably carried by said saw housing; a drive shaft housing carried by said saw housing; a blade drive shaft operably engaging said saw blade for rotating said saw blade in said saw housing, said blade drive shaft extending through said drive shaft housing; an adaptor provided in said drive shaft housing, said adaptor comprising an adaptor base for attachment to said drive shaft housing and a shaft cylinder extending from said adaptor base, wherein said blade drive shaft extends through said adaptor base and said shaft cylinder of said adaptor; and a gasoline-powered blade drive unit having a drive shaft receptacle and a split attachment collar provided on said drive shaft receptacle for receiving and engaging said shaft cylinder of said adaptor for engaging and rotating said blade drive shaft, said shaft cylinder of said adaptor inserted in said drive shaft receptacle and said split attachment collar of said blade drive unit, whereby said saw blade rotates in said saw housing responsive to operation of said gas-powered blade drive unit.

* * * * *